United States Patent [19]
Deyerle

[11] 3,814,089
[45] June 4, 1974

[54] DRILL JIG FOR TOTAL HIP PROSTHESIS

[76] Inventor: William Minor Deyerle, 2222 Monument Ave., Richmond, Va. 23220

[22] Filed: Sept. 24, 1971

[21] Appl. No.: 183,418

[52] U.S. Cl.................. 128/92 EB, 3/1, 128/303, 128/83
[51] Int. Cl. ....... A61f 5/04, A61f 1/24, A61b 17/18
[58] Field of Search........ 3/1; 128/83, 92 C, 92 CA, 128/92 R, 92 B, 92 BA, 92 BC, 92 F, 92 EB, 92 G, 303

[56] References Cited
UNITED STATES PATENTS

| | | | |
|---|---|---|---|
| 2,200,120 | 5/1940 | Nauth........................... | 128/92 EB |
| 3,486,500 | 12/1969 | Ball et al......................... | 128/92 R |
| 3,670,724 | 6/1972 | Bosacco........................ | 128/92 D |

FOREIGN PATENTS OR APPLICATIONS

| | | | |
|---|---|---|---|
| 1,118,773 | 7/1968 | Great Britain.................. | 128/92 R |

*Primary Examiner*—Richard A. Gaudet
*Assistant Examiner*—Ronald L. Frinks
*Attorney, Agent, or Firm*—Mason, Fenwick and Lawrence

[57] ABSTRACT

A fixation of the femoral prosthesis member in the femur in performing hip prosthesis surgery, and the jig structure used in performing such fixation, wherein a jig comprising an elongated leg member having plural drill guide holes is releasably secured to the shank of the prosthesis member so that the drill guide holes aline precisely with fastener openings in the prosthesis shank. When the assembled prosthesis member and jig are in proper position relative to the femur, a drill bit is passed through the jig holes to drill holes through the cortex of the femur to receive fixation fasteners. An additional guide sleeve may be passed through such holes to guide a smaller drill bit for drilling holes in the femur beyond the prosthesis shank.

5 Claims, 4 Drawing Figures

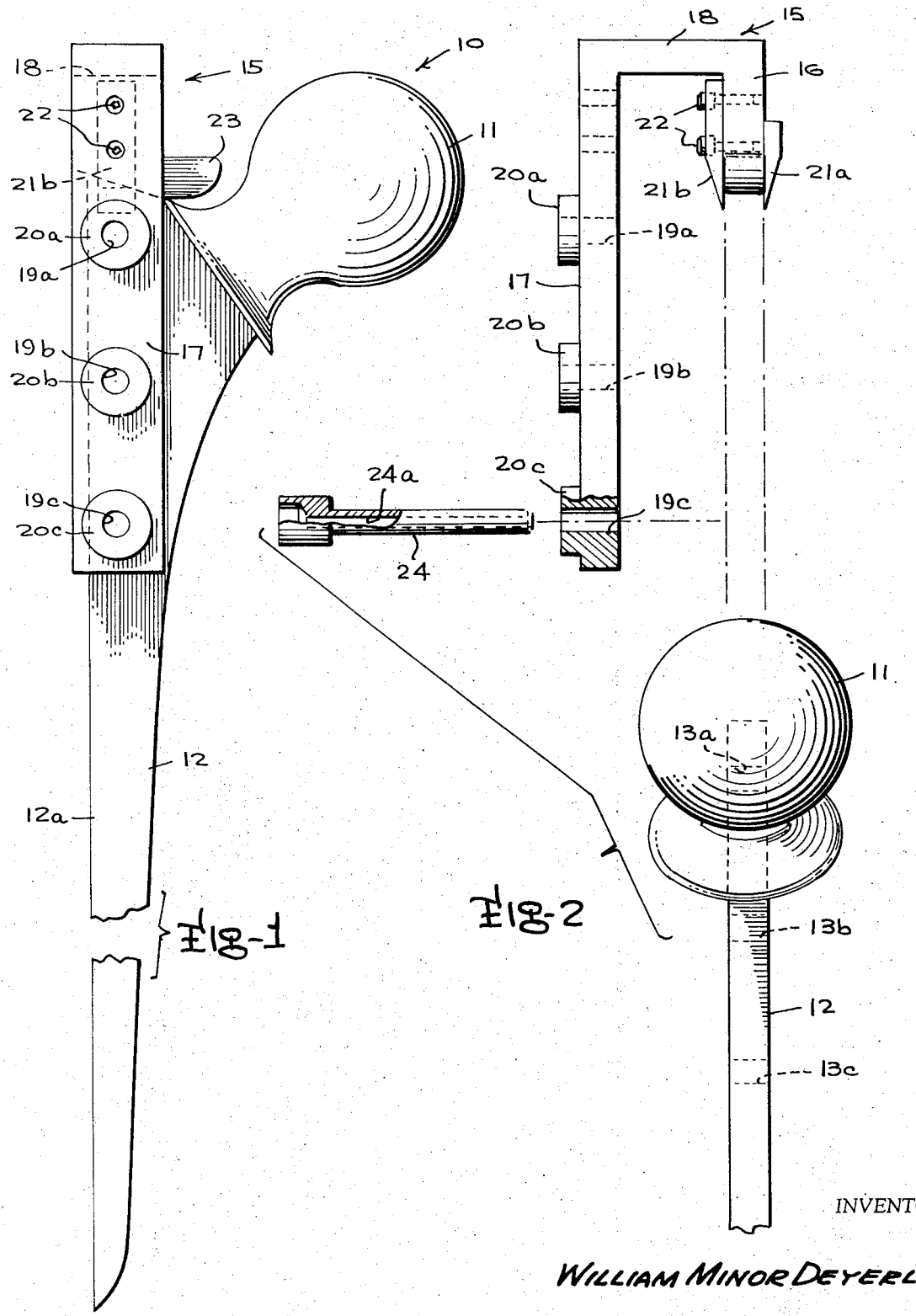

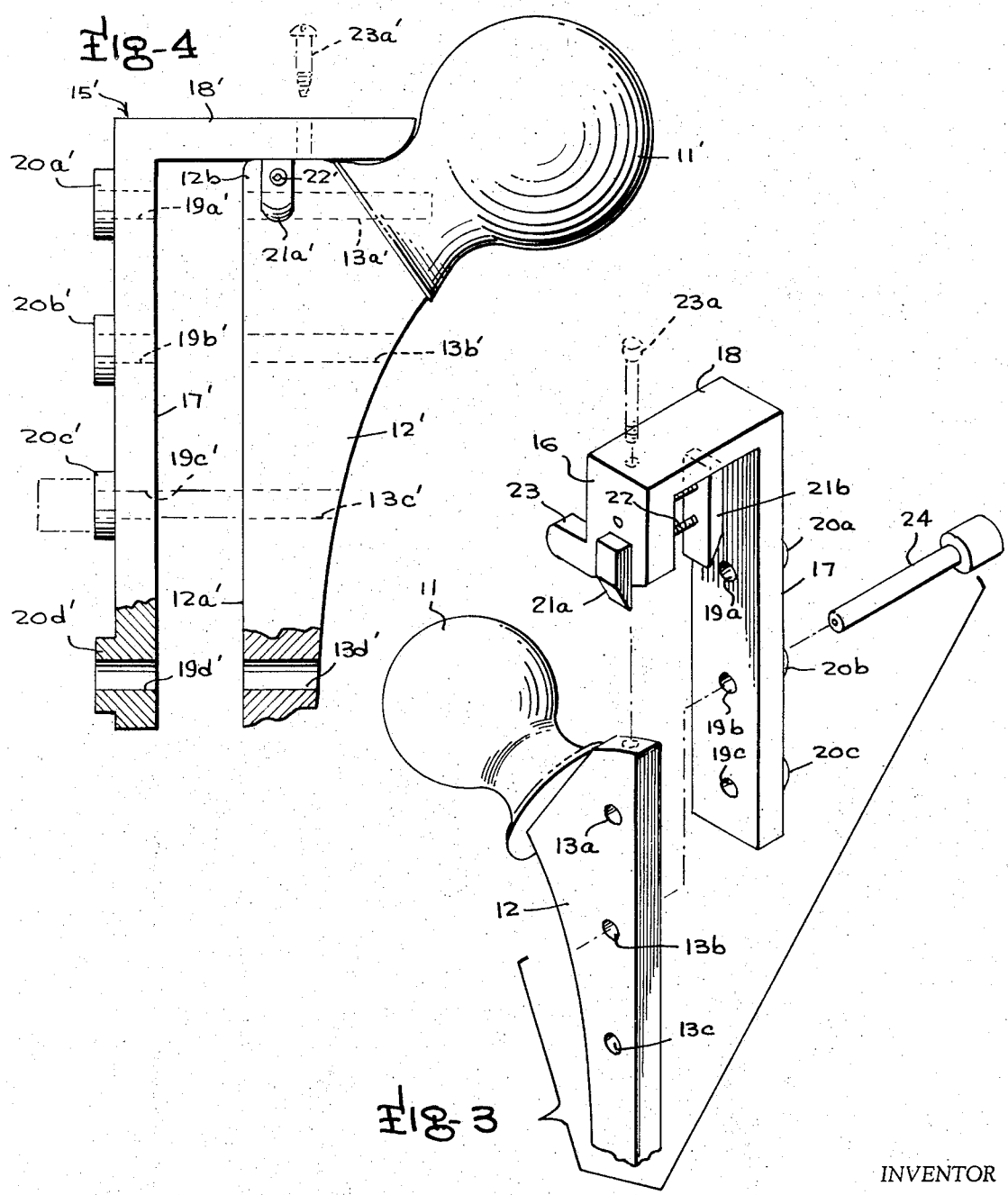

DRILL JIG FOR TOTAL HIP PROSTHESIS

BACKGROUND AND OBJECTS OF THE INVENTION

The present invention relates in general to an apparatus for properly locating the holes in the femoral shaft of the thigh bone for fixing the femoral or head prosthesis member in a femur shaft in connection with performing total hip prosthesis surgery, and more particularly to the provision of a novel jig structure adapted to be releasably assembled to the prosthetic head member prior to its attachment to the femur to provide a guide for locating the drill holes to be provided in the femur for attachment of the head member.

Heretofore, total hip prosthesis surgery has been performed wherein a cup is fitted in the acetabulum and a head prosthesis member, which comprises a shank portion and an artificial head, is fixed to the femur to provide a prosthetic hip joint. Considerable difficulties have been encountered in properly locating and fixing the femoral portion or head prosthesis member in proper position in the femur shaft, because of difficulty in exactly locating the holes to be drilled through the femoral shaft to aline with the preformed holes in the shank of the femoral prosthesis member and intersect the seating recess which is reamed in the femural shaft to receive this shank.

An object of the present invention is to provide a system of accurately drilling the holes in the femur in performing total hip prosthesis surgery, and a novel jig structure which will be clamped to or removably assembled on the femoral portion of the hip prosthesis prior to its insertion into the seating recess in the femoral shaft and which provides a plurality of guide holes for properly locating the drill to permit drilling of the transverse holes through the femoral shaft.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a side elevation view of the jig structure of the present invention shown in assembled relation on the femoral portion of the total hip prosthesis;

FIG. 2 is an end elevation thereof, viewed from the right hand side of FIG. 1, showing the same in exploded relation to the femoral prosthesis portion and the apertured guide sleeve;

FIG. 3 is an exploded perspective view thereof; and

FIG. 4 is a side elevation view of a modified form of the jig structure located in an alternate placement position on the femoral portion of the hip prosthesis.

DETAILED DESCRIPTION OF THE PREFERRED EMBODIMENT

In the performance of the total hip prosthesis by the lateral approach, the technique for insertion of the total hip prosthesis by the lateral approach will first be generally reviewed. After the fascia has been opened and the trochanter with its abductor muscles identified, abductors are carefully dissected off of the trochanter up to its proximal one-half to three-quarters of an inch. The abductors are left attached to this proximal tip of the trochanter. The proximal tip of the trochanter is carefully osteomotized to avoid any fracture of the distal stock of the femur, which osteotomy may be accomplished with a power saw. A piriformis is frequently attached near the osteotomy site and this is released, and the external rotators which are usually attached partially to the released portion of the trochanter and partially to the distal femur, are individually released. The anterior capsule and the expansion of the origin of the rectus femorus are identified and removed with the cutting cautery. The lateral capsule is separated from the few fibers of the abductor muscles and it also is removed with the cutting cautery. The capsule is delineated carefully from the rectus femorus and the medial portion of the capsule is removed. The posterior capsule is then removed with the cutting cautery.

The head and neck of the femur are removed directly in a transcervical direction with either a power saw, Gigley saw, or a sharp osteotome, taking care not to fracture the distal stock of the femur. Using the conventional template for the cup member of the total prosthesis, the position of the cup is checked to see how the cup will seat at a 30° angle. The conventional acetabular index template is used to determine the 30° angle, and the degree of reaming that will be necessary is determined at this point. Making every effort to protect the lateral quarter of inch cartilage in the acetabulum, the cartilages are removed with sharp dissection in the reaming portion of the acetabulum. After the cartilage has been removed, small reamers are used to gradually ream the recipient acetabulum to accept the cup.

The acetabular index template is reinserted at intervals to determine the proper fit for the cup. A template is used to start the slots for the phalanges on the cup. A sharp instrument is then used to deepen these to appropriate depths. At least three screws for fixing the cup in the acetabulum are then inserted.

Previous orientation with simple prostheses and cups have tended to err on the side of a loose fit. However, the exact opposite is true with the total hip prosthesis, as an extremely tight fit is essential. In order to obtain a tight fit, an estimate should be made of the amount of the neck of the femur to be removed to obtain this fit. Then slightly less than the estimated amount should be removed. This must be done with power instruments in order to avoid fracture. The cookie cutter and template reamer are used to the previously marked most inferior portions of the neck. This mark should be done with a power burr or cautery or drill point before the head and neck is removed so that one will always be oriented to the most inferior portion of the neck. Using the template reamer, the reamer is gradually seated and several attempts are made at the prosthesis. After examining the recipient femur, if there is a large area of cancellous bone surrounding the anterior and posterior edges of the reamer, this cancellous bone should be curretted out. The space available is determined and the removed head and neck are used to fashion cortical bone shims that will fill up the space where the cancellous bone has been removed to give a tight fit superiorly and inferiorly in addition to the usual expected tight fit on the calcar. One or two trial insertions with the proper amount of shimming will usually demonstrate the proper amount of shim cortical bone that will be placed anteriorly and posteriorly in some cases before a really firm seating is secured.

One form of prosthesis for the femoral portion of the total hip is illustrated in FIG. 1 of the accompanying drawings, indicated by the reference character 10, and comprises the head portion 11 and the flat shank 12 having a plurality of transverse one-fourth inch holes 13a, 13b and 13c therein. The shank 12 is of elongated tapering configuration having a straight inner edge 12a and a top shoulder 12b. The jig of the present invention is indicated by the reference character 15, and comprises a generally U-shaped body portion formed of a shorter longitudinal leg member 16, a longer longitudinal leg member 17, and a transverse or cross member 18 interconnecting the upper edges of the legs 16 and 17. The longer leg 17 has three one-fourth inch holes therein corresponding to the locations of the one-fourth inch holes 13a, 13b and 13c in the prosthesis shaft 12, the holes in the leg 17 of the jig being indicated by the reference characters 19a, 19b and 19c. In the preferred embodiment, an enlarged annular collar formation 20a, 20b and 20c surrounds the outer or entrance end of the openings 19a, 19b and 19c.

In one form of the invention, there is mounted on the first or shorter leg 16 of the jig a clamp assembly comprising a pair of clamping jaws 21a, 21b, one of which is regulated by a screw 22, for example, for forcing the jaw members 21a, 21b toward each other to clamp them against opposite lateral side edges of the upper end portion of the flat shank 12 of the prosthesis adjacent the top shoulder 12b to removably secure the jig to the prosthesis. The leg member 16 may also have a forwardly projecting shoulder extension indicated at 23 to be seated against the top shoulder 12b at the base of the head 11 on the prosthesis for properly locating the vertical position of the jig 15. Alternatively, the jaws 21a, 21b may be dispensed with, and a tapped opening may be provided in the shoulder extension along an axis paralleling the longitudinal axis of leg 17 to receive a screw, shown in phantom lines at 23a in FIG. 3, for screw fixation of the jig to the prosthesis while the hole drilling procedure is performed.

Before inserting the prosthesis, the jig 15 is first clamped or screwed to the shank 12 of the prosthesis 10 to double check its position to see that the drill holes 19a, 19b and 19c of the jig are properly lined up with the holes 13a, 13b, and 13c in the prosthesis 10. The jig is then removed, and prosthesis is inserted into the seating recess in the femur shank provided for it and is tapped home firmly so that there is an accurate fit anterior and posterior under the rim of the prosthesis and all bone shims are well in place. Jig 15 is then assembled onto the prosthesis shank and the holes are drilled by a one quarter inch drill through the cortex by guiding the drill bit through the holes 19a, 19b and 19c of the jig and through the alined holes 13a, 13b and 13c of the prosthesis shank. The surgeon should then palpate through the jig and the hole to double check the alinement of the holes in the prosthesis. The screws or the end of the drill may be used for this palpation. After the drill passes through the holes 13a, 13b and 13c in the prosthesis to the deep cortex, shouldered and apertured sleeve indicated at 24 in the drawings, is then inserted through the quarter inch opening 19a, 19b or 19c of the jig through the superficial cortex and the holes in the prosthesis. A small drill which fits within the center bore 24a in the sleeve is then inserted in the sleeve 24 to drill the deep cortex. This drill preferably has a diameter half way between the external diameter of the fixation screws for the prosthesis 10 and the root diameter of the threads on these screws to allow for maximum bight on the deep cortex. The depth gauge should be used to have an accurate fit so that the threads will go through the deep cortex.

The surgeon then reduces the prosthesis using the reduction lever to avoid fracturing the distal femur. Using 18 gauge stainless steel wire, the tip of the greater trochanter is reattached to the roughened spot on the lateral side of the femur moving it as far distally as possible. In some instances, one of the three holes through the prosthesis and femur drilled through the guide holes 19a–19c may be left for looping the wire through them, using the two transverse fixation bolts through the remaining holes. The wires may be looped around the shaft of the femur. After careful insertion of the stainless steel wire suture in such manner as to incorporate the greater trochanter and/or the tendon insertion of it, the remaining portion of the abductor muscles that were detached by sharp dissection are then resutured to the surrounding soft tissues or to drill holes in the lateral cortex. Before tightening the 18 gauge wire loop through the femur prosthesis, one strand each of no. 3 chromatic cat-gut sutures are placed under and through some of the abductor mechanism, and are tied firmly with the hip in slight abduction. These sutures act as insurance against dislocation for several weeks.

FIG. 4 illustrates a modified form of the jig structure, indicated by the reference character 15', adapted for used with a femoral portion 10' of the total hip prosthesis wherein the holes or tapped openings, as the case may be, indicated at 13a' to 13d' in the shank 12' extend along axes which are perpendicular to the inner edge 12a' of the prosthesis shank. This modified form of jig 15' includes a top member 18' corresponding to the transverse or cross member 18 of the earlier version, and a vertical leg member 17' having one quarter inch holes 19a' to 19d' corresponding to the locations of the holes 13a' to 13d' in the prosthesis shank 12'. As with the earlier embodiment, enlarged annular collar formations 20a' to 20d' surround the outer or entrance ends of the openings 19a' to 19d'.

The top member 18' carries a pair of clamping jaws indicated at 21a' having an adjustment screw 22', for example an Allen head screw, extending through a threaded opening in the jaw 21a' to butt against the shank 12 near the top shoulder 12b thereof and clamp the same between the companion jaw and th screw, to hold the jig 15' in the position shown with the outer or free end portion of the top member 18' butting against the top shoulder 12b. Alternatively, a tapped opening may be provided in the top member 18' along an axis paralleling the longitudinal axis of the leg 17' to receive a screw, shown in phantom lines at 23a', for screw fixation of the jig 15' to the prosthesis 10' while the hole drilling procedure is performed.

With this jig construction illustrated in FIG. 4, the jig 15' is assembled onto the prosthesis shank 12' after the prosthesis has been inserted into the seating recess in the fermur shank, and the holes in the bone are drilled by a one quarter inch drill by guiding the drill bit through the holes 19a' through 19d' and into the alined holes 13a' – 13d' of the prosthesis shank. After palpating through the jig and the hole to double check the alinement of the holes in the prosthesis, the fixation screws or bolts are then applied to fix the prosthesis 10' in the femoral shaft.

What is claimed is:

1. A jig for attachment to a femoral prosthesis member of the type including an elongated shank having plural vertically spaced fixation fastener openings therein to be fixed in a channel formed in the femur during total hip prosthesis surgery, the jig comprising an elongated vertical rigid leg member having a plurality of cylindrical guide holes therein of predetermined size and vertical spacing, the openings in the shank correpsonding to the spacing and location of the holes in said leg member, an elongated rigid top member extending at right angular relation to said leg member having attachment means adapted for releasably fixing the jig to the upper portion fo said shank in firmly and precisely held immovable relation to the shank for supporting said leg member in parallelism with said shank with the guide holes precisely alined with the holes in the shank, the surfaces of the guide holes serving as directional guides for directing a drill bit of like diameter in exact axial alinement with the shank holes when a surgeon inserts such drill bit for accurately drilling holes through the cortex for fixation fasteners, said attachment portion of said top member comprising a short depending leg paralleling said leg member, said short depending leg having a downwardly facing abutment surface adapted to engage the top surface of the shank.

2. A jig for attachment to a femoral prosthesis, as defined in claim 1, wherein said attachment portion of said top member comprises a short depending leg paralleling said leg member, said short depending leg having a downwardly facing abutment surface to engage the top surface of the shank and including jaw members extending below said abutment surface to releasably clamp the jig onto the upper portion of said shank with said guide holes precisely axially alined with said openings in said shank.

3. A jig for attachment to a femoral prosthesis, as defined in claim 1, wherein said attachment portion of said top member comprises a short depending leg paralleling said leg member, said short depending leg having a downwardly facing abutment surface to engage the top surface of the shank and screw means extending through said attachment portion to project into a threaded opening in the top of said shank to releasably clamp the jig onto the upper portion of said shank with said guide holes precisely axially alined with the openings in said shank.

4. A jig for attachment to a femoral prosthesis as defined in claim 1, including a shouldered tubular guide sleeve including an annular cylindrical portion having an outer diameter corresponding to said guide holes fitted within one of said guide holes and adapted to extend from said leg member to said shank through said guide holes and said openings and holes drilled in the femur therebetween, said sleeve having a smaller diameter bore extending therethrough to receive a corresponding diameter drill therethrough and adapted to guide the drill into deep cortex beyond said shank to receive end portions of fixation fasteners projecting beyond the shank.

5. A jig for attachment to a femoral prosthesis, as defined in claim 2, including a shouldered tubular guide sleeve including an annular cylindrical portion having an outer diameter corresponding to said guide holes fitted within one of said guide holes and adapted to extend from said leg member to said shank through said guide holes and said openings and holes drilled in the femur therebetween, said sleeve having a smaller diameter bore extending therethrough to receive a corresponding diameter drill therethrough and adapted to guide the drill into deep cortex beyond said shank to receive end portions of fixation fasteners projecting beyond the shank.

* * * * *